United States Patent [19] [11] 3,725,583
Gundersen et al. [45] Apr. 3, 1973

[54] VOLUME AND TONE CONTROL FOR MULTI-CHANNEL AUDIO SYSTEMS

[75] Inventors: Philip D. Gunderson, Prospect Heights; Ronald J. Freimark, Addison, both of Ill.

[73] Assignee: Motorola, Inc., Franklin Park, Ill.

[22] Filed: July 20, 1970

[21] Appl. No.: 56,301

[52] U.S. Cl..................179/1 VL, 179/1 D, 179/1 G, 330/130

[51] Int. Cl...........................................H03f 3/68

[58] Field of Search.....179/1 VL, 1 D, 1 G; 330/155, 330/30, 29, 130, 30 D

[56] References Cited

UNITED STATES PATENTS

| | | | |
|---|---|---|---|
| 3,036,158 | 5/1922 | Romano | 179/1 VC |
| 3,039,062 | 6/1962 | Nessel | 179/1 G |
| 3,260,952 | 7/1966 | Kaye et al. | 179/1 VL |
| 3,135,830 | 6/1964 | Starai | 179/1 G |
| 3,512,096 | 5/1970 | Nagata et al. | 330/29 |
| 2,488,410 | 11/1949 | Keizer | 178/44 |

FOREIGN PATENTS OR APPLICATIONS

| | | | |
|---|---|---|---|
| 800,674 | 12/1968 | Canada | 179/1 D |

OTHER PUBLICATIONS

Burstein, "Stereo Amplifier Controls," Aug. 1959, Electronics World, pages 55–57 & 122.

*Primary Examiner*—Ralph D. Blakeslee
*Assistant Examiner*—Douglas W. Olms
*Attorney*—Mueller and Aichele

[57] ABSTRACT

A single volume control for a plurality of audio channels is formed by a pair of gain controllable differential amplifiers operated as small-signal amplifiers in an open-ended configuration. The current source for each differential amplifier is provided by a variable current source, such as a transistor collector. By altering the DC bias on this variable current source transistor, the bias current and therefore the gain of the differential amplifier is correspondingly varied. A single potentiometer provides the DC voltage control for the variable current source transistors which, in turn, function as a volume control for the circuit.

5 Claims, 2 Drawing Figures

PATENTED APR 3 1973 3,725,583

Inventor
PHILIP D. GUNDERSON
RONALD J. FREIMARK
BY
Mueller & Aichele
ATTYS.

VOLUME AND TONE CONTROL FOR MULTI-CHANNEL AUDIO SYSTEMS

BACKGROUND OF THE INVENTION

This invention relates generally to volume control circuits and, more particularly, to a volume control circuit for multi-channel audio signal translating systems.

Heretofore, volume control circuits for audio systems, such as stereo systems, would require the use of two or more discrete variable resistance devices, such as potentiometers, connected to a common shaft for control by a common knob. This arrangement provides means for simultaneously varying the volume of both channels of a stereo system. However, with advanced electronic technology, the electronic circuitry of such audio systems is made smaller and smaller and the conventional ganged-together variable resistance elements remain a constant drawback as to decreased size of the circuits. Two variable resistance elements are needed in the circuit configurations used heretofore to maintain signal isolation of the respective channels. That is, it was not possible to control the signal translation of two channels with a single variable resistance because the resistance element used would then act as a mixing network for the signals and the stereo channel separation would no longer be maintained.

SUMMARY OF THE INVENTION

Accordingly, it is an object of this invention to provide a volume control circuit for multiple channels of audio translation whereby the volume for each of the channels is controlled by means of a single variable resistance element.

Another object of this invention is to provide a volume control circuit for a multi-channel audio system which is more compact and less expensive than heretofore provided.

A feature of this invention is the use of a pair of gain controlled differential amplifiers which are operated as small-signal amplifiers in an open-ended configuration with a transistor connected thereto to act as a current source.

Briefly, the volume control circuit of this invention incorporates a pair of interconnected transistors to form a differential amplifier in each channel of the audio signal translation system. The differential amplifiers are operated as small-signal amplifiers in an open-ended configuration, and the current source for each differential amplifier is provided by a current sink transistor which changes in collector current in accordance with the changes in bias applied thereto. By altering the bias, by means of a single variable resistance element, the control of source current to the differential amplifiers is correspondingly varied which, in turn, changes the output value of the audio signal being translated therethrough. The volume of sound obtained in each channel is then controlled in response to a single potentiometer which controls the amplitude of the audio signal by merely changing the DC level applied to the current sink transistor in each channel. The output of each differential amplifier is taken from the non-inverting collector of the output transistor and coupled to a suitable driver stage for amplification and then reproduced in a speaker system. If desired, the output may be taken from the collector of the inverting transistor of the differential pair with the addition of a suitable collector resistor. A signal balancing resistor is connected between the respective output of the volume controls to balance the signal levels in each channel.

Tone control of the audio signal may also be obtained by a single variable resistance element connected in circuit with a transistor which, in turn, is connected in series with a capacitor and this combination of elements is at the input of each volume control circuit in each channel. By varying the single potentiometer, tone control for each channel is achieved. By providing a transistor with the emitter electrode thereof connected to ground potential and the collector electrode thereof connected through the capacitor to the input of each of the signal channels, an inexpensive circuit is provided and one that will function on multiple channels by a single potentiometer. The variable bias on the tone transistors effect the AC resistance of the transistors to provide a variable input at each channel. At saturation conditions of the tone transistors, full treble signal filtering is accomplished, and at cutoff condition of these transistors, no change in the circuit is effected and maximum treble signals are translated through each channel. The bass boost effect is accomplished by cross-coupling the tone and volume controls so that increasing the bass control will effectuate an increase in total volume. This actually increases the gain across the audio band, but the higher treble frequencies are shunted to ground as a result of the treble filter response.

The following detailed description is to be taken in conjunction with the accompanying drawings wherein like reference numerals throughout the various views of the drawings are intended to designate similar elements or components.

DESCRIPTION OF THE PREFERRED EMBODIMENT

Figures 1, 2:
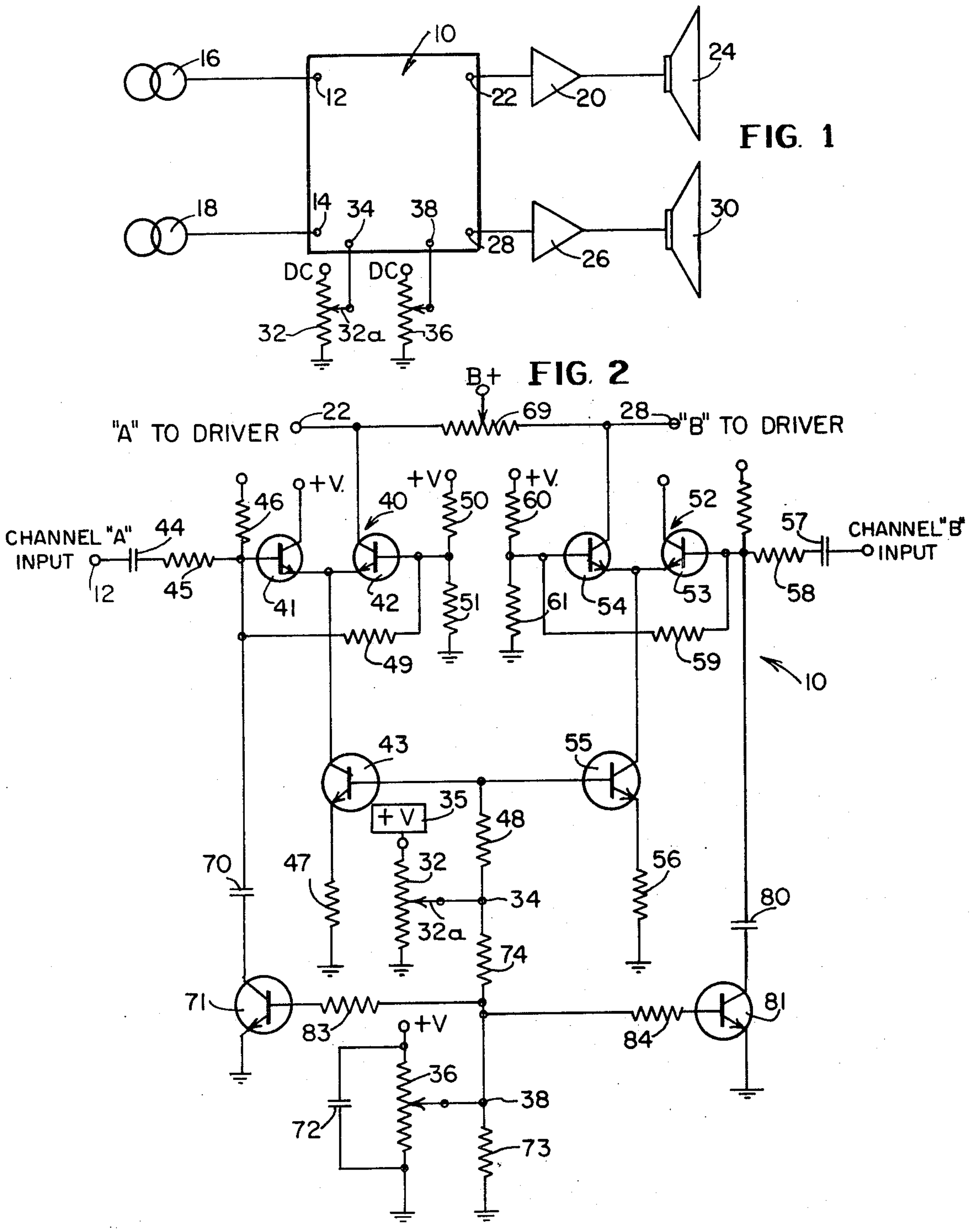
FIG. 1 is a simplified block diagram of a common volume control arrangement for a two-channel stereophonic audio reproducing system.
FIG. 2 is a detailed schematic diagram showing the common volume control circuit constructed in accordance with this invention.

Referring now to FIG. 1, there is seen a common volume control circuit designated generally by reference numeral 10 and includes a pair of input terminals 12 and 14 connected to separate audio signal sources 16 and 18, respectively. The audio signal from the audio source 16 is translated through the volume control circuit 10 and applied to a power amplifier circuit 20 via an output terminal 22. The signal from the amplifier 20 is then reproduced by a speaker 24 in the conventional manner. Similarly, the signal from the audio source 18 is translated through the volume control circuit 10 and applied to a power amplifier circuit 26 via an output terminal 28 and reproduced by a speaker 30.

Most advantageously, a single variable resistance element 32 is connected to an input terminal 34 to provide a volume or gain control for the signals translating through both channels of the gain control circuit 10 without causing cross-talk or mixing of these signals. A second potentiometer 36 is connected to an input terminal 38 to provide a single variable resistance element to control the tone, i.e. to control the bass and treble characteristic, of the signal passing through the circuit.

The circuit arrangement of the preferred embodiment is best illustrated in FIG. 2 which shows a detailed schematic diagram of the volume control circuit 10 and wherein like reference numerals at various circuit points correspond to those shown in FIG. 1. Here the input signal from terminal 12 is applied to a first differential amplifier 40 comprising a pair of transistors 41 and 42 which have their emitter electrodes connected together and to a current sink transistor 43. The current sink transistor 43 acts as a current source for the transistors 41 and 42. The signal at terminal 12 is coupled through a capacitor 44 and a resistor 45 to the base electrode of transistor 41 which, in turn, is forward biased by a resistor 46.

Transistor 43, on the other hand, is biased to a state of conduction which is dependent on the condition of the wiper arm 32a on potentiometer 32. The potentiometer 32 is connected to any suitable voltage source 35. The emitter electrode of the transistor 43 is connected to ground potential through a fixed resistor 47 and is forward biased by the source 35. The DC potential at potentiometer 32 is coupled through a fixed resistor 48 to the base electrode of transistor 43 to vary the current supplied to the differential amplifier 40. A minimum signal translation value will be maintained between transistors 41 and 42 as a result of a coupling resistor 49 connected between the base electrodes of each of these transistors. However, with a sufficient current source provided by transistor 43, the signal coupling between the transistors 41 and 42 is from the base-emitter of transistor 41 to the emitter-collector of transistor 42 and therefrom to the output terminal 22. Transistor 42 is forward biased by a pair of resistors 50 and 51 connected to the base electrode thereof and to a suitable voltage source.

Similarly, audio signals from the input terminal 14 are applied to a differential amplifier 52 comprising a pair of transistors 53 and 54 having their emitters connected together and to a current sink transistor 55. The emitter of transistor 55 is connected to ground potential through a resistor 56. This circuit arrangement operates exactly in the same manner as the circuit arrangement of the differential amplifier 40. That is, the input signal is coupled through a capacitor 57 and a resistor 58 to the base electrode of the transistor 53 and then translated from transistor 53 to transistor 54 depending on the current value provided by transistor 55. The minimum current coupling between transistors 53 and 54 is maintained by a coupling resistor 59 connected between the base electrode of these transistors. In like manner, the transistor 54 is forward biased by a pair of resistors 60 and 61 which are connected to a suitable voltage source, which may be the same as source 35. The output of transistor 54 is coupled to the output terminal 28 and therefrom the power amplifier 26 and speaker 30, as seen in FIG. 1. A balance control 69 is connected between the output terminals 22 and 28 to control the amount of B+ applied to the output transistors 42 and 54 which, in turn, will control the relative volume or balance of the two channels.

A tone control circuit may be incorporated in the circuit by providing high frequency shunting means at the input of each differential amplifier circuit. To this end, a capacitor 70 has one end connected to the base electrode of the transistor 41 and the other end thereof is connected to ground potential through a transistor 71. Transistor 71 will provide a variable resistance to the input signal and shunt high frequency signals through the capacitor 70 to ground potential, depending on the resistance value of the transistor. This is accomplished by varying the resistance value of the potentiometer 36 connected to the base electrode of the transistor 71. A capacitor 72 may be connected across the potentiometer 36 for additional filtering of the bias potential. The input circuit point 38 of the potentiometer 36 is also connected to a fixed resistor 73. However, the circuit point 38 is interconnected with the circuit point 34 through a resistor 74 so as to have a circuit interconnection between the tone control and the volume control potentiometers 36 and 32, respectively. This will provide a bass boost circuit by causing a uniform gain over the entire frequency spectrum when it is desired to boost the bass signal frequencies. This is accomplished simultaneously with the filtering out of the high frequencies, treble tones, at the input of transistors 41 and 53 by maximum conduction of transistor 71. That is, maximum bias applied to the base electrodes of transistor 71, and to a transistor 81 similarly connected to a capacitor 80, will cause maximum high frequency signals to be shunted to ground potential. However, this action will also increase the bias applied to circuit point 34 which, in turn, will increase the overall volume of the circuit.

The base electrodes of transistors 71 and 81 each have a series resistance element 83 and 84, respectively, to limit the bias potential applied thereto.

What has been described is a novel volume control circuit for controlling simultaneously the volume of each channel in a multi-channel audio system by use of a single potentiometer which changes the DC potential applied to differential amplifier circuits. Similarly, tone control is accomplished in a multi-channel system by the use of a single potentiometer.

I claim:

1. In an audio system having at least two channels for translating audio signals therethrough to speaker output means, the combination including, a volume control circuit in each channel of the audio system, each said volume control circuit being responsive to a varying direct current bias to control the gain of the audio signal in each channel, a first variable resistance element coupled between a source of direct current voltage and respective ones of said volume control circuits, whereby operation of said first variable resistance element varies the direct current bias simultaneously to each said volume control circuit to vary the gain of the audio signal in each channel, a tone control circuit in each channel of the audio system, each said tone control circuit being responsive to a varying direct current bias to control the tone of the audio signal in each channel, a second variable resistance element coupled between a source of direct current voltage and respective ones of said tone control circuits, whereby operation of said second variable resistance element varies the direct current bias simultaneously to each said tone control circuit to vary the tone of the audio signal in each channel, and resistance means connecting said second variable resistance element to said first variable resistance element whereby operation of said second variable resistance element to change the tone of the audio signal in each channel simultaneously varies the bias from said first variable resistance element to change the volume in each channel.

2. The audio system of claim 1 wherein said volume control circuit includes differential amplifier means and an electron control device having a first electrode coupled to said differential amplifier means, a second electrode coupled to a reference potential and a control electrode, said differential amplifier means having input means for receiving audio signal information and output means for translating the audio signal information to the speaker output means, said first variable resistance element coupled between said source of direct current voltage and the respective control electrodes of each of said current control devices.

3. The audio system of claim 2 wherein each said tone control circuit includes high frequency shunting circuit means connected to the input of each differential amplifier means, said high frequency shunting circuit means being responsive to a bias voltage being applied thereto to provide a tone control in each of the channels, said second variable resistance element coupled between each high frequency shunting circuit means and said source of direct current voltage for applying a varying bias thereto to effect the tone control.

4. The audio system of claim 2 further including a third variable resistance element connected between said output means of each said differential amplifier means to provide a balance control between the two channels.

5. The audio system of claim 3 wherein said high frequency shunting circuit means includes a semiconductor having input, output and control electrodes, and a capacitor, said capacitor being connected between said input of said differential amplifier means and said input electrode of said semiconductor, said output electrode of said semiconductor being connected to a reference potential, and said control electrode thereof being connected to said second variable resistance element.

* * * * *